UNITED STATES PATENT OFFICE.

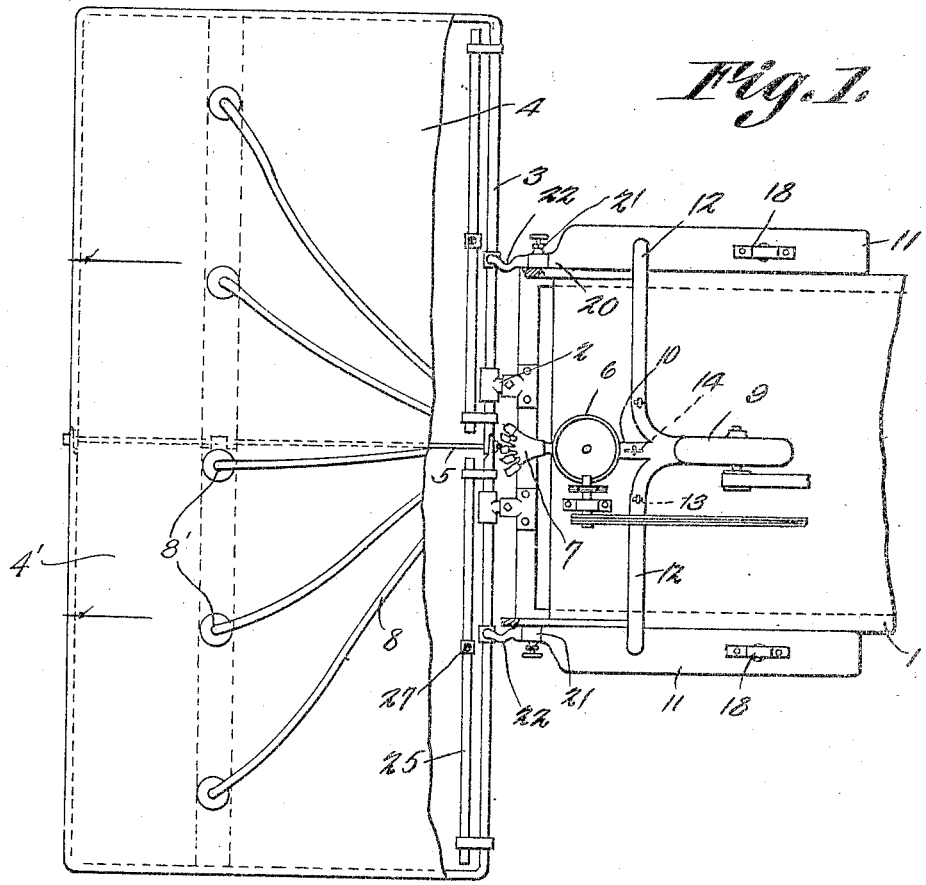
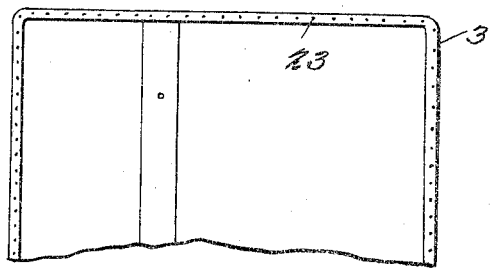

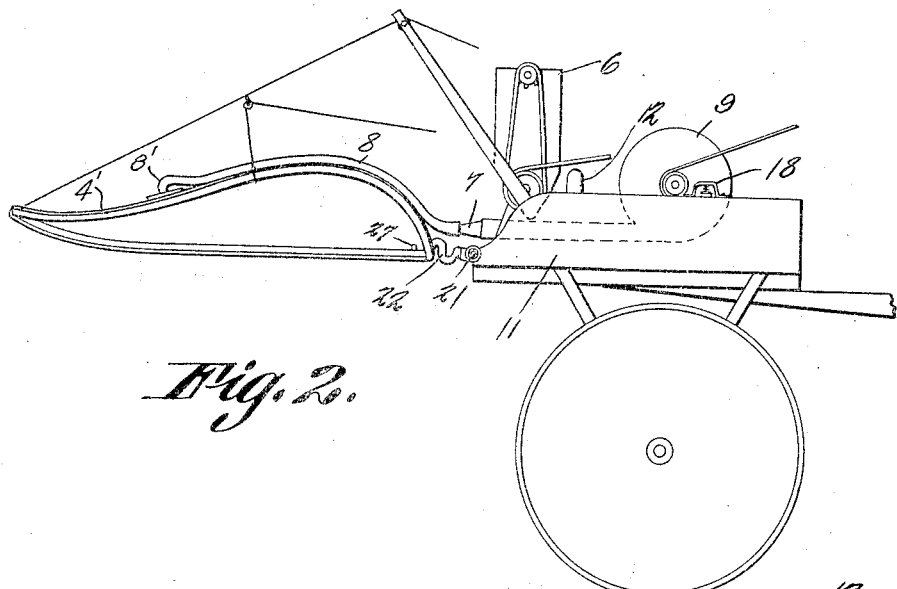
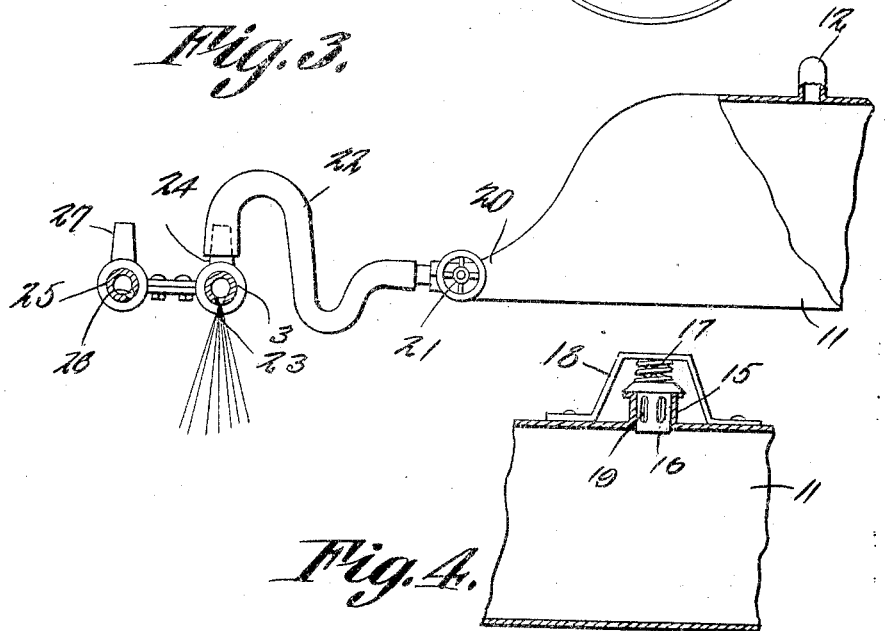

JOSEPH M. SALADINER, OF BRYAN, TEXAS.

COTTON-PEST-DESTROYING MACHINE.

1,382,017.  Specification of Letters Patent.  Patented June 21, 1921.

Application filed May 1, 1920. Serial No. 378,272.

*To all whom it may concern:*

Be it known that I, JOSEPH M. SALADINER, a citizen of the United States, residing at Bryan, in the county of Brazos and State of Texas, have invented a new and useful Cotton-Pest-Destroying Machine, of which the following is a specification.

This invention relates to a machine particularly designed for use in the destruction of boll weevils and other pests of a like nature, it being more especially an improvement upon the structure disclosed in my copending application Number 354,749, filed by me on Sept. 8, 1919.

One of the objects of the invention is to provide a machine which, in addition to directing poisonous powder onto plants being treated, is also capable of supplying moisture to all portions of the plants so that when the powder is directed onto the plants it will adhere thereto. Thus the machine is especially useful in localities which are very dry.

A further object is to provide a machine of this character having means whereby fluid of any kind can be sprayed directly on the vegetation, it being possible to use a destructive fluid upon vegetations such as weeds and the like growing along fences and at the edges of cotton fields where the insects breed, the fluid thus used serving not only to destroy the insects but also the vegetation on which they are found.

A further object is to provide improved means whereby the liquid used for spraying the vegetation is held constantly under pressure so as to be expelled with sufficient force to properly moisten all portions of the plants being treated.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a plan view of a portion of a machine having the present improvements combined therewith, parts being broken away.

Fig. 2 is a side elevation of the structure shown in Fig. 1.

Fig. 3 is an enlarged view partly in section and partly in elevation of a portion of one of the pressure tanks and showing its connection with the drain pipe.

Fig. 4 is a section through a portion of one of the tanks and showing its relief valve.

Fig. 5 is a bottom plan view of a portion of one of the wings or hoods of the machine.

Referring to the figures by characters of reference 1 designates a portable structure having swivel connections 2 upon the rear end thereof which are slidably engaged by the pipes 3 forming the frames of the hingedly connected wing sections 4, these pipes being U-shaped and closed at their ends, the ends of the two pipes lapping and being pivotally mounted on a rod 5 as shown. The cover of the wing, which can be of canvas or any other suitable flexible sheet material has been indicated generally at 4'.

Mounted on the structure 1 is a powder container 6 having a distributing hand 7 extending therefrom, and from which hand project flexible tubes 8 which open downwardly through the wings 4 forming nozzles 8'. A fan casing has been indicated at 9 and communicates through a flue 10 with the bottom portion of the container 6 so that, when the fan is operated, the air blast passing under the container 6 will force the powder, which is of a poisonous substance, through the tubes 8 and the wings 4 so that it will be scattered over the plants overhung by the wings during the forward movement of the machine.

The structure thus far described has already been disclosed in my application heretofore mentioned and, in itself, constitutes no part of the present invention.

It has been found that in very dry climates it is a difficult matter to use powder as a poison because of the fact that it will not properly adhere to the plants. In order to overcome this objection I have provided means whereby moisture can be directed onto the plants in advance of the spreading of the powder so that when the powder is distributed it will adhere to the plants. The means provided for this purpose consists of one or more tanks 11 which can be fastened to the sides or at any other points on the structure 1. In the present instance two of these tanks have been shown, one at each side of the machine. Each tank has an air inlet flue 12 opening into the top thereof and extending from one side of the flue 10, each of these flues 12, which may be considered as branches of the flue 10, has a damper 13 for controlling the flow of air through it and another damper 14 may be provided in the flue 10 for the purpose of controlling the flow of air to the distributing hand 7.

Each of the tanks has an outlet port 15 normally closed by means of a release valve 16 which is held normally seated by a spring 17 bearing against a bracket 18 extending over the port. The spring can be of such tension as to hold the valve 16 closed until a predetermined pressure is obtained within the tank. The valve is provided preferably with longitudinal slots 19 so that when the pressure in the tank rises above a predetermined point, the valve 16 will be elevated thereby and the slots 19 will be gradually exposed to the external atmosphere, thus allowing the air gradually to escape. As soon as the pressure in the tank is relieved the valve will be automatically reseated.

Each of the tanks has an outlet extension 20 provided with a valve 21 and connected to each of these extensions is a flexible tube 22.

As before stated the frame of each of the wings 4 is formed of a substantially U-shaped pipe. This pipe extends along three sides of each wing and has its bottom portion formed with small apertures 23. A nipple 24 extends upwardly from each of the pipes 3 and is adapted to be engaged by one of the flexible tubes 22, as shown in Fig. 3.

Arranged within each wing close to and parallel with the back portion of its frame member or pipe 3 is a spraying pipe 25 having outlet openings 26 therein which are arranged to direct jets of spray downwardly and rearwardly from the pipe, as shown in Fig. 3. Each of these spray pipes 25 has a nipple 27 extending therefrom adjacent the nipple 24 and which is likewise adapted to be detachably engaged by one of the flexible tubes 23.

It will be understood that when the machine is in operation a portion of the air expelled by the fan in the casing 9 will be directed through each of the branch flues 12 while the remainder will be directed to the spreading hand 7. The air directed to the branches 12 will be discharged into the tanks 11 where the water contained in the tanks will be held under compression. The air directed to the hand 7 will blow poisonous powder onto the plants under the wings or hoods 4 and as the machine is moving forward the powder will be directed onto the plants along the row as will be obvious. In dry weather, however, it is necessary to first connect the flexible tubes 22 to the nipples 27. By then opening the valve 21 jets of spray will be directed downwardly and forwardly as the machine moves along the row so as to thoroughly moisten the plants before the powder is blown upon them. Thus it will be seen that when the powder does reach the plants it will adhere thereto.

Should it be desired to sprinkle water over a large area the flexible tubes 22 can be connected to the nipples 24 as shown in Figs. 1 and 3.

Should it be desired to destroy plants and insects around the edges of the field, petroleum or other liquid can be substituted for the water in the tank and can be discharged into the pipes 23 and sprayed onto the plants as the machine is carried around the field.

It will be understood of course that by means of the dampers 13 and 14 the flow of air to the various parts of the apparatus can be controlled at all times.

It is to be understood that by providing wings or hoods 4 the dust directed under the said wings or hoods will be caused positively to come into contact with the plants thereunder so as to adhere to the moistened surface thereof. Without these wings or hoods the dust would tend to blow away and scatter so as to render the machine inefficient.

What is claimed is:

1. The combination with a movably supported structure, a wing thereon and means for scattering a dust upon plants beneath the wing, of means carried by said structure for spraying plants in advance of the powder distributing means.

2. In a machine of the class described the combination with a portable structure, wings carried thereby for extending over plants, and means for directing powder into the wings and spreading it over the plants thereunder, of liquid spraying means along the advancing portions of the wings, means for holding liquid under pressure, and a valved connection between said holding means and the spraying means.

3. A machine of the class described including a movably supported structure, wings carried thereby adapted to extend over plants to be treated, means along the advancing portions of the wings for spraying plants passing under the wings, and means for directing powder into the wings to spread it upon the sprayed plants.

4. The combination with a movably supported structure, and a wing carried thereby, of separate means for successively spraying plants adjacent the structure and dusting with a powder the plants under the wing.

5. The combination with a movably supported structure, of wings carried thereby for extending over plants, a blower, means connected to the blower for directing air under pressure to the wings to convey powder onto plants below the wings, a liquid storage tank, means for conveying air under pressure from the blower to the tank, a pipe connected to each of the wings, and having outlet apertures, and a valved connection between the storage tank and said pipe.

In testimony that I claim the foregoing as my own, I have hereto affixed my signature in the presence of two witnesses.

JOSEPH M. SALADINER.

Witnesses:
LAMAR BETHEA,
R. S. TAYLOR.